United States Patent [19]

Hojo et al.

[11] Patent Number: 4,863,199
[45] Date of Patent: Sep. 5, 1989

[54] SEPARATION PREVENTIVE PIPE JOINT

[75] Inventors: Sadamune Hojo; Toshiyuki Iwamoto; Noriyuki Arakawa, all of Amagasaki; Terutaka Narita, Itami, all of Japan

[73] Assignee: Kubota, Ltd., Osaka, Japan

[21] Appl. No.: 118,461

[22] Filed: Nov. 9, 1987

[30] Foreign Application Priority Data

Apr. 13, 1987 [JP] Japan .................................. 62-91493
Jul. 30, 1987 [JP] Japan ........................... 62-117544[U]

[51] Int. Cl.[4] ........................................... F16L 21/02
[52] U.S. Cl. .................................... 285/232; 285/224; 285/321
[58] Field of Search ............... 285/104, 105, 111, 116, 285/232, 237, 223, 321, 224

[56] References Cited

U.S. PATENT DOCUMENTS 3,724,880 4/1973 Seiler .................................. 285/321
4,417,754 11/1983 Yamaji et al. ...................... 285/321
4,606,559 8/1986 Rammelsberg ..................... 285/223

FOREIGN PATENT DOCUMENTS 2205000 8/1973 Fed. Rep. of Germany ...... 285/321
3117225 11/1982 Fed. Rep. of Germany ...... 285/321
6713595 4/1969 Netherlands ........................ 285/111
605006 7/1948 United Kingdom ................ 285/321

Primary Examiner—Randolph A. Reese
Assistant Examiner—A. Anthony Knight
Attorney, Agent, or Firm—Joseph W. Farley

[57] ABSTRACT

The inner surface of the open end of a socket for a pipe is formed with a taper portion and a lock ring is received on the inner periphery of the taper portion. The outer peripheral portion of the socket corresponding to the taper portion is tapered in the same direction so that the wall thickness of the socket at the taper portion has a suitable value. When a pull-out force acts on a spigot inserted in the socket, the wedge action of the taper portion presses the lock ring against the spigot, whereby the separation is prevented. If an excessive pull-out force acts thereon, the portion of the socket which has the suitable thickness is deformed for radial expansion so as to allow the pull-out of the lock ring. Thereby, the pipe joint and the pipe body are prevented from being broken by the excessive force.

5 Claims, 2 Drawing Sheets

SEPARATION PREVENTIVE PIPE JOINT

FIELD OF THE INVENTION

The present invention relates to a separation preventive pipe joint.

BACKGROUND OF THE INVENTION

Heretofore, pipe joints which require expansibility, for example, pipe joints for use in earthquake -prone areas where severe earthquakes are expected or in soft ground have been proposed. Such pipe joints are designed so that they can be expanded and contracted axially of the pipe and so that they have flexibility, and they are constructed so that even if expansion or contraction takes place, they will never finally slip out.

According to the conventional pipe joints described above, however, because of the construction which does not allow the pipe joint to finally slip out when pipes connected together by the pipe joint are moved away from each other beyond the allowable expansion limit, there is a problem that an accidental break occurs in the pipe joint or pipe body.

DISCLOSURE OF THE INVENTION

The present invention, which solves the above problem, has for its object the provision of a separation preventive pipe joint adapted to finally slip out when subjected to a pull-out force above a certain limit, thereby preventing the pipe joint and pipe body from being broken.

To achieve the above object, a separation preventive pipe joint according to the invention of the type in which a spigot formed on the end of one pipe is inserted in a socket formed in the end of the other pipe, comprises:

a tapered portion formed on the inner periphery of the open end of the socket and shaped to increase in diameter toward the inner region of the socket, a lock ring of circumferentially split construction in annular form which can be radially expanded and contracted and whose outer periphery contacts said tapered portion and whose inner periphery embraces the spigot, and an outer peripheral socket portion shaped to increase in diameter from the open end of the socket correspondingly to said tapered portion, wherein the socket at the tapered portion is deformed for radial expansion to allow the slip-out of said lock ring when subjected to a pull-out force above a certain limit applied to the tapered portion through the lock ring.

In such arrangement, when it is desired to connect pipes using the joint, the spigot is inserted into the socket with the lock ring fitted in the tapered portion in advance. At this time, the lock ring, embracing the spigot, expands and allows the passage of the spigot. When a pull-out force acts on the spigot, the outer periphery of the lock ring, which tends to move with the spigot toward the open end of the socket, abuts against the tapered portion of the socket and the lock ring is contracted against the spigot by the radially inwardly directed force produced by this abutment, thereby preventing the separation of the spigot. When the spigot pull-out force applied to the tapered portion through the lock ring increases beyond a certain value, the open end of the socket is urged by this force to radially expand to allow the pull-out of the lock ring, thereby preventing the pipe joint and the pipe body from being broken.

DESCRIPTION OF THE EMBODIMENTS

Figure 1:
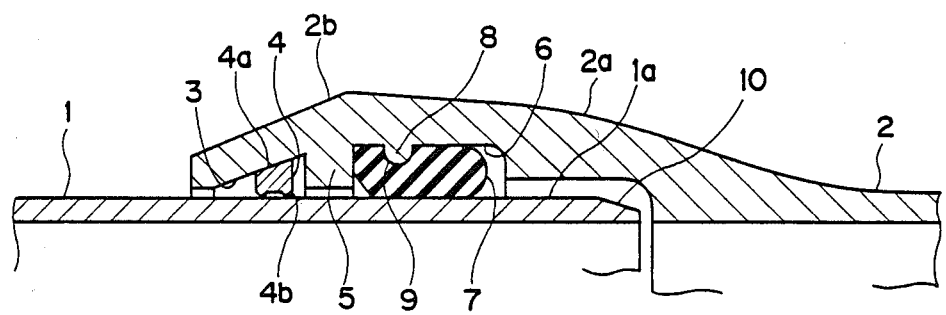
FIG. 1 is a sectional view of the principal portion of a first embodiment of a separation preventive pipe joint according to the invention.
Figure 2:
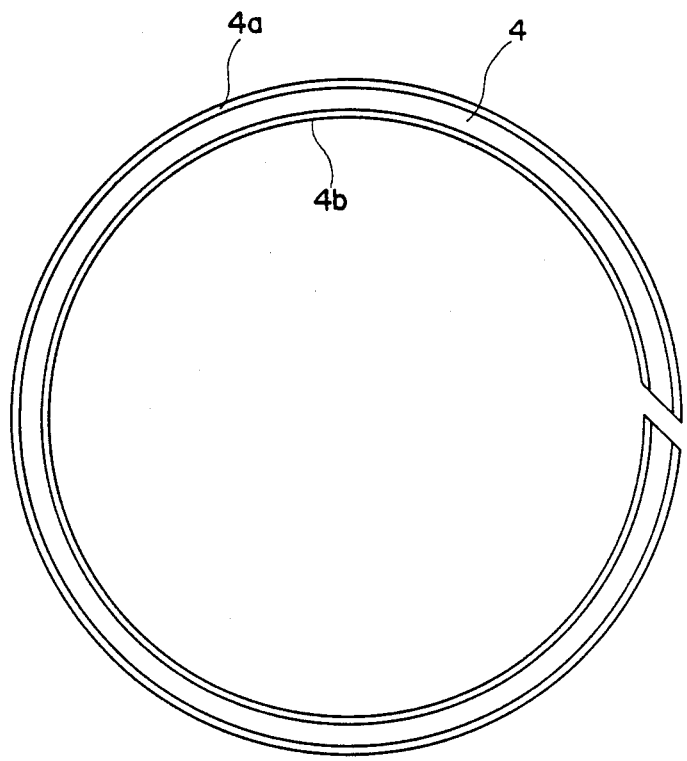
FIG. 2 is a side view of a lock ring shown in FIG. 1.

A first embodiment of the invention will now be described with reference to the drawings. In FIGS. 1 and 2, a spigot 1a formed on the end of one pipe 1 is inserted in a socket 2a formed in the end of the other pipe 2. The inner periphery of the open end of the socket 2a is formed as a tapered portion 3 increasing in diameter toward the inner region. Disposed on the inner periphery of the tapered portion 3 is an annular lock ring 4 split at one circumferential location, as shown in FIG. 2, for radial expansion and contraction. The outer peripheral surface of the lock ring 4 abutting against the tapered portion 3 is formed as a tapered surface 4a conforming to the tapered portion 3. The inner peripheral surface of the lock ring 4 embracing the spigot is formed with edges 4b.

The inner end of the tapered portion 3 on the inner surface of the socket 2a is formed with a radially inwardly extending annular stop portion 5, beyond which is formed a radially recessed annular groove portion 6. In the groove portion 6, a ring packing 7 is disposed pressed against the spigot 1a. The ring packing 7 has on its outer periphery an annular recess 9 engaging a radially inwardly projecting annular projection 8 formed on the groove 6, so that the ring packing 7 is locked against axial movement. The front end of the spigot 1a has its outer peripheral corner 10 chamfered so that it tapers off.

The outer peripheral portion 2b of the open end of the socket 2a is shaped to have its diameter increased correspondingly to the tapered portion 3, so that the wall thickness of the socket 2a at the tapered portion 3 does not disturb the radial expandability of the tapered portion 3. As a result, when the spigot 1a is urged to pull out, the socket 2a is radially expanded to allow the pull-out of the lock ring 4 when a pull-out force on the spigot 1a beyond a certain limit is applied to the tapered portion 3 through the lock ring 4.

The function of the above arrangement will now be described.

When it is desired to connect pipes using this joint, first the ring packing 7 and the lock ring 4 are fitted into the socket 2a and then the spigot 1a is inserted from the opening in the socket 2a into its inner region. At this time, the lock ring 4 disposed on the inner periphery of the tapered portion 3 has been decreased in diameter to abut against the outer peripheral corner portion 10 of the spigot 1a. And as the insertion of the spigot 1a proceeds, the lock ring 4 is moved to the inner region while abutting against the outer peripheral corner portion 10, until it abuts against the stop portion 5 and is thereby locked. Since the tapered portion 3 is shaped for increasing in diameter toward the inner region, the lock ring 4 at this position is allowed to radially expand. Therefore, the lock ring 4 is radially expanded while being spread by the outer peripheral corner portion 10 of the spigot 1a and allows the passage of the spigot 1a while embracing the spigot 1a. The spigot 1a passing through the lock ring 4 is inserted into the socket 2a while pressing the ring packing 7. At this time, the ring packing 7 is pressed against the inner periphery of the goove 6 and the outer periphery of the spigot 1a to seal the clearance between the socket 2a and the spigot 1a.

Figure 3:
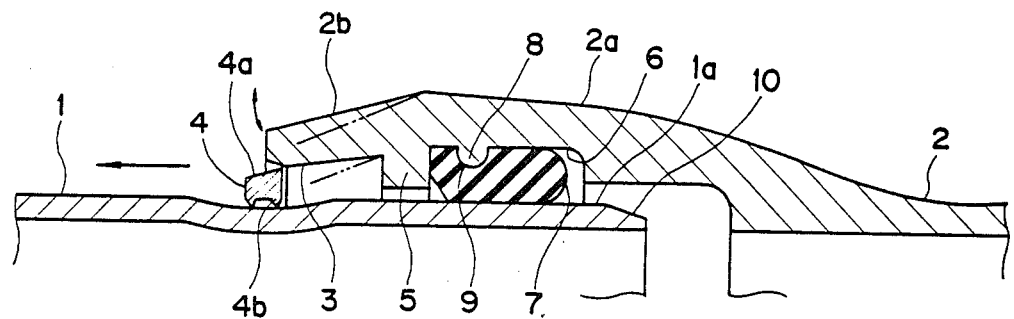
FIG. 3 is a sectional view showing a state in which, in the pipe joint shown in FIG. 1, a pull-out force acts on a spigot.

When the spigot 1a is moved in the direction in which it pulls out of the socket 2a, the lock ring 4 embracing the spigot 1a through the edges 4b on the inner periphery is moved toward the open end of the socket 2a and the tapered surface 4a on the outer periphery abuts against the tapered portion 3 of the socket 2a. At this time, since the tapered portion 3 is decreased in diameter toward the open end, the lock ring 4 has its edges 4b pressed against the spigot 1a as the lock ring is subjected to a radially inwardly directed force produced as a reaction to its tapered surface 4a pressing against the tapered portion 3 by a wedge action, thereby preventing the separation of the spigot 1a. When the pull-out force on the spigot 1a applied to the tapered portion 3 of the socket 2a through the tapered surface 4a of the lock ring 4 further increases beyond a certain limit, the open end of the socket 2a is deformed to radially expand, as shown in FIG. 3, thereby allowing the pull-out of the lock ring 4. When the lock ring has thus pulled out, although the separation preventive function is lost, the function of a pipe joint can be maintained so long as the spigot 1a remains pressing the ring packing 7.

Figure 4:
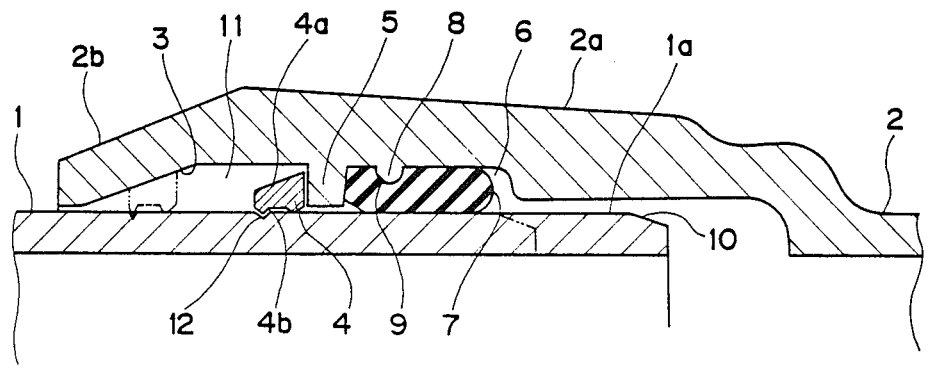
FIG. 4 is a sectional view of the principal portion of a second embodiment of a separation preventive pipe joint according to the invention.

FIG. 4 shows a second embodiment of the invention. In the separation preventive pipe joint shown in FIG. 4, the stop portion 5 is formed at a position spaced a certain distance inward from the tapered portion 3, and a pull-out allowance 11 allowing the axial movement of the lock ring 4 is formed between the tapered portion 3 and the stop portion 5. The outer periphery of the spigot 1a is formed with a groove 12 at a position spaced a suitable distance from the front end of the spigot 1a, said groove engaging one of the edges 4b of the lock ring 4 to axially lock the lock ring 4.

The function of the above arrangement will now be described. First, with the ring packing 7 and the lock ring 4 fitted in the socket 2a, the spigot 1a is inserted into the socket 2a. Thereupon, the lock ring 4 abuts against the outer peripheral corner 10 of the front end of the spigot 1a and moves together with the spigot toward the inner region until it abuts against the stop portion 5, whereupon it radially expands to allow the passage of the spigot while embracing the spigot 1a. When the spigot 1a has been inserted a certain distance into the socket 2a with the groove 12 reaching the position corresponding to the lock ring 4, the edge 4b engages the groove 12. As a result of this engagement, the spigot 1a is axially locked by the lock ring 4. Since the insertion force on the spigot 1a is stopped by the stop portion 5 of the socket 2a, it is ascertained that the lock ring 4 has been fitted in the groove 12 of the spigot 1a.

When a pull-out force acts on the spigot 1a, the lock ring 4 with its edge 4b engaging the groove 12 is moved together with the spigot 1a within the pull-out allowance 11 toward the open end of the socket 2a until the tapered surface 4a on its outer periphery abuts against the tapered portion 3. And the lock ring 4 is subjected to a radially inwardly directed force from the tapered portion 3 to be pressed against the spigot 1a, with the edge 4b cutting into the groove 12, thereby preventing the separation of the spigot 1a. Therefore, the spigot 1a is free to expand and contract relative to the socket 2a over a distance corresponding to the pull-out allowance 11 within which the lock ring 4 is moved, and the separation is prevented by the lock ring 4.

When the pull-out force on the spigot 2a further increases to exceed a certain limit, the open end of the socket 2a is deformed as in the case of FIG. 3.

When a plurality of pipes are to be connected to form a pipeline, for example, the pipe joints shown in FIG. 1 and the pipe joints shown in FIG. 4 may be used in combination such that one pipe joint shown in FIG. 4 is used every plurality of pipe joints shown in FIG. 1.

What is claimed is:

1. A separation preventive pipe joint of the type is which a spigot formed on the end of one pipe is inserted in a socket formed in the end of the other pipe, comprising:

a tapered portion formed on the inner periphery of the open end of the socket and shaped to increase in diameter toward the inner region of the socket, a lock ring of circumferentially split construction in annular form which can be radially expanded and contracted and whose outer periphery contacts said tapered portion and whose inner periphery embraces the spigot, an outer peripheral socket portion shaped to increase in diameter from the open end of the socket correspondingly to said tapered portion, wherein the socket at the tapered portion is deformable for radial expansion to allow the slip-out of said lock ring when subjected to a pull-out force above a certain limit applied to the tapered portion through the lock ring, and a ring packing disposed in an annular groove formed in the socket axially inwardly from said tapered portion.

2. A separation preventive pipe joint as set forth in claim 1, including:

an annular projection formed on the inner periphery of the socket at a position spaced a certain distance inward from the tapered portion, said projection extending radially inward for engagement with the lock ring, edge means annularly formed on the inner periphery of said lock ring to radially project for contact with the outer periphery of the spigot, and an annular groove formed on the outer periphery of the spigot at a position spaced a certain distance from the front end of the spigot to engage said edge means.

3. A separation preventive pipe joint as set forth in claim 1, including:

a cylindrical surface formed on the inner periphery of the socket and extending axially inwardly from the inner end of said tapered portion;

an annular projection formed on the inner periphery of the socket, said annular projection extending radially inward from said cylindrical surface for engagement with said lock ring and being spaced a certain axial distance inward from said tapered portion;

radially inwardly projecting annular edge means formed on the inner periphery of said lock ring for contact with the outer periphery of the spigot; and an annular groove formed on the outer periphery of the spigot, said annular groove being engageable by said edge means whereby the spigot and lock ring are movable axially relative to the socket within the axial limits of said cylindrical surface.

4. A separation preventive pipe joint of the type in which the spigot formed on the end on one pipe is inserted in a socket formed in the end of the other pipe, comprising:

- an inner tapered portion formed on the inner periphery of the socket, said inner tapered portion extending axially inwardly of the socket from adjacent to the open end thereof and increasing in diameter inwardly of the socket;
- an annular circumferentially split lock ring, said lock ring being radially expandable and contractable and having an outer periphery contacting said inner tapered portion and an inner periphery embracing the spigot;
- an annular groove formed on the inner surface of the socket axially inwardly of said inner tapered portion and said lock ring, and a ring packing disposed in said annular groove for sealing engagement with the outer periphery of the spigot;
- an outer tapered portion formed on the outer periphery of the socket, said outer tapered portion extending axially of the socket from the open end thereof and having a taper corresponding to that of said inner tapered portion, the wall portion at the open end of the socket between said inner and outer tapered portions being adapted to expand radially in response to a pull-out force above a certain limit applied to said inner tapered portion through said lock ring whereby the lock ring can pull out from the socket without breaking the pipes and the pipe joint is maintained as long as said ring packing engages the outer periphery of the spigot.

5. A separation preventive pipe joint as set forth in claim 4 further comprising:

- an annular projection formed on the inner periphery of the socket at a certain axial distance inwardly of the socket from said inner tapered portion for engagement of said lock ring, the socket being formed with a cylindrical inner surface extending between the inner end of said inner tapered surface and said annular projection; said lock ring being axially movable within said cylindrical inner surface;
- edge means annularly formed on the inner periphery of said lock ring for contact with the outer periphery of the spigot, and
- an annular groove formed on the outer periphery of the spigot for engagement by said edge means, said annular groove being spaced from the front end of the spigot a distance such as to be engageable by said edge means of said lock ring when engaging said annular projection whereby the spigot is axially movable relative to the socket within the limits defined by engagement between said lock ring and said annular projection and by engagement between said lock ring and said inner tapered portion.

* * * * *

UNITED STATES PATENT AND TRADEMARK OFFICE
CERTIFICATE OF CORRECTION

PATENT NO. : 4,863,199

DATED : September 5, 1989

INVENTOR(S) : Sadamune Hojo et al.

It is certified that error appears in the above-identified patent and that said Letters Patent is hereby corrected as shown below:

Column 4, line 16, "is" should read --in--

Signed and Sealed this

Fourth Day of September, 1990

Attest:

HARRY F. MANBECK, JR.

*Attesting Officer*        *Commissioner of Patents and Trademarks*